United States Patent [19]

Kunes et al.

[11] Patent Number: 5,195,668
[45] Date of Patent: Mar. 23, 1993

[54] ARTICLE HOLDER

[75] Inventors: Robert J. Kunes; Lupe J. Kunes, both of Ventura, Calif.

[73] Assignee: Regina Coeli Enterprises, Inc., Oxnard, Calif.

[21] Appl. No.: 510,847

[22] Filed: Apr. 18, 1990

[51] Int. Cl.⁵ .............................................. A60R 7/00
[52] U.S. Cl. ..................... 224/312; D3/34; D16/129; 248/902; 248/214; 248/215; 296/97.5; 296/37.8
[58] Field of Search ............ 224/312, 311, 309, 42.42, 224/42.43, 42.44; D3/34; D16/129; 248/902, 214, 215; 493/914; 206/5 R; 296/97.5, 37.8

[56] References Cited

U.S. PATENT DOCUMENTS

| D. 184,038 | 12/1958 | Chase | D14/6 |
| D. 307,822 | 5/1990 | Marks | D3/34 |
| D. 310,301 | 9/1990 | Burrow | D3/34 |
| 2,486,096 | 10/1949 | Axford et al. | 296/97.5 |
| 2,541,962 | 2/1951 | Healey | 206/5 R |
| 2,688,395 | 9/1954 | Gay, Jr. et al. | 206/5 R |
| 2,826,387 | 11/1953 | Rutten | 248/902 |
| 2,909,276 | 10/1959 | Stegeman | 206/5 R |
| 2,966,985 | 1/1961 | Morris | 206/5 R |
| 3,016,262 | 1/1962 | Hunt | 296/97.5 |
| 4,290,522 | 9/1981 | Takasaki | 224/312 |
| 4,521,051 | 6/1985 | Cody et al. | 296/97.5 |
| 4,984,682 | 1/1991 | Cummins | 206/5 R |

FOREIGN PATENT DOCUMENTS

| 570693 | 9/1958 | Belgium | 224/312 |
| 2728906 | 1/1979 | Fed. Rep. of Germany | 206/5 R |
| 474381 | 8/1969 | Switzerland | 296/97.5 |

Primary Examiner—Henry J. Recla
Attorney, Agent, or Firm—Breiner & Breiner

[57] ABSTRACT

An article holder which is generally of an S-shaped cross section and includes an upper slot for receiving an edge portion of a vehicle sun visor and a lower slot for receiving an article to be temporarily held within a vehicle, such as sunglasses or eyeglasses. The article holder is easily fitted onto the sun visor and positions the article held thereby in a readily accessible position. If desired, the article may also carry a holder for a pen or pencil and also a mirror. The article holder preferably includes a sheet metal core covered by suitable fabrics with the fabrics being applied to the sheet metal core when the core is in its flat planar state, after which the core is bent to the desired S-shaped configuration of the article holder.

1 Claim, 1 Drawing Sheet

U.S. Patent  Mar. 23, 1993  5,195,668
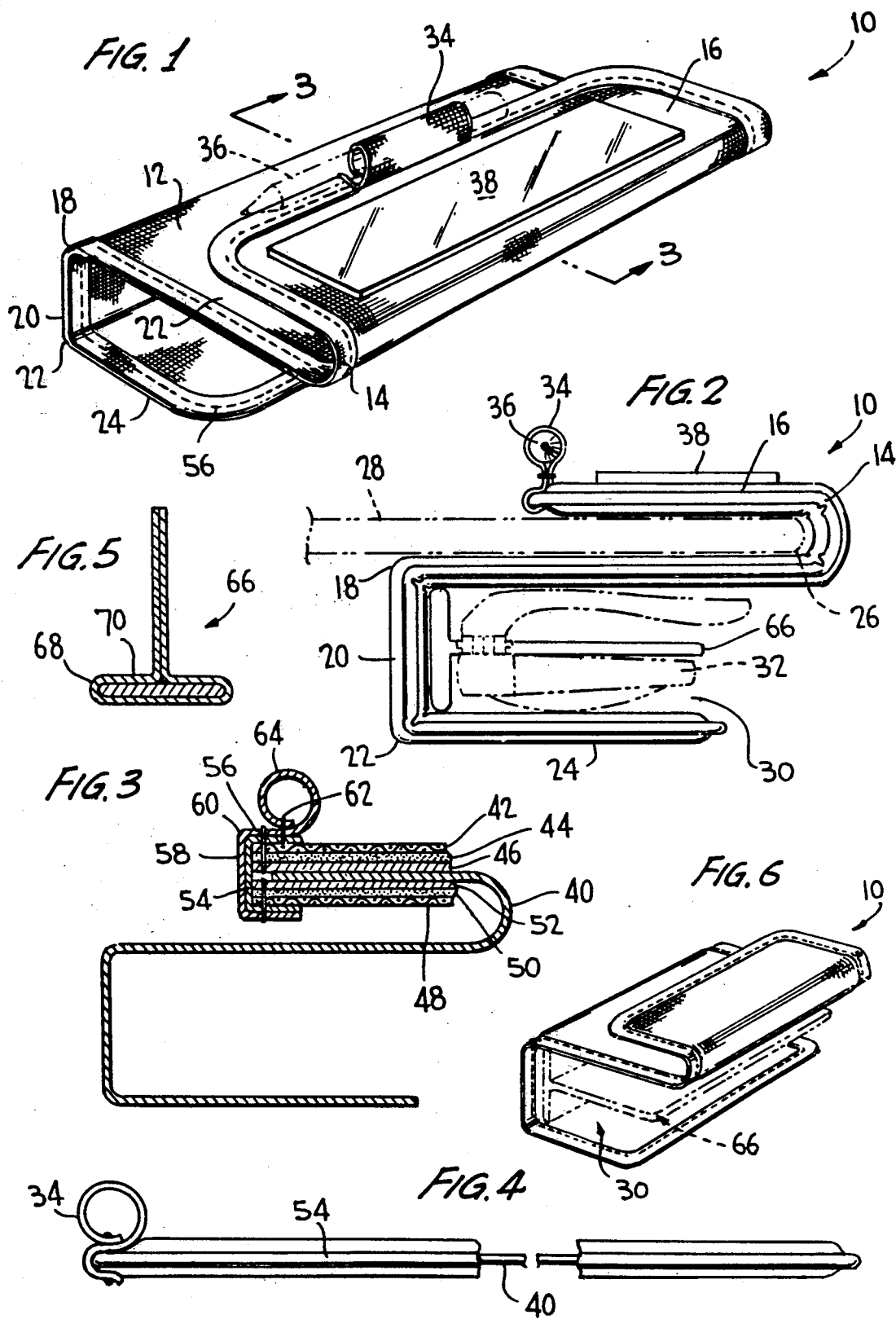

ARTICLE HOLDER

This invention relates in general to new and useful improvements in article holders, and more particularly to an article holder for attachment to a vehicle sun visor or the like with the article holder being particularly adapted to hold eyeglasses.

There is a particular need for a holder for small articles, particularly eyeglasses, which should be readily available. With respect to the eyeglasses, many people utilize sunglasses only while driving and others have special driving glasses.

In accordance with this invention, the article holder is of a generally S-shaped configuration and includes an upper slot for receiving the sun visor and a deeper lower slot for receiving the article to be held, for example eyeglasses.

The article holder may also have incorporated therein an elastic sleeve for receiving a pen or pencil and there may be provided a mirror which becomes available when the sun visor is swung down.

A particular feature of the article holder is the construction thereof. The article holder includes a rigid core of sheet metal or other suitable material which is covered by a suitable fabric. The fabric is applied to the rigid core in the flat state and thereafter the core is bent to the desired S-shaped configuration.

Further, the fabric will be provided with a suitable backing which can be adhesively bonded to the rigid core without the adhesive coming through the fabric. The article holder may also have the edges thereof trimmed by way of a tape which is sewed to the fabric covering and its associated backing.

With the above and other objects in view that will hereinafter appear, the nature of the invention will be more clearly understood by reference to the following detailed description, the appended claims, and the several views illustrated in the accompanying drawing.

FIG. 1 is a top perspective view of the article holder from one end thereof and shows the general configuration of the article holder.

FIG. 2 is a schematic side elevational view of an outer portion of a sun visor with the article holder applied thereto and having mounted in the lower slot thereof eyeglasses.

FIG. 3 is a transverse vertical sectional view taken through the center of the article holder generally along the line 3—3 of FIG. 1 with parts broken away and shows the general details of construction of the article holder.

FIG. 4 is an end view of the article holder with parts broken away of the article holder in an intermediate stage of manufacture.

FIG. 5 is a side elevational view in section of the T-Shaped divider member.

FIG. 6 is a top perspective view of the article holder from one end thereof with the T-Shaped divider member.

Referring now to the drawing in detail, it will be seen that there is illustrated the article holder which is generally identified by the numeral 10. The article holder 10, when viewed from the opposite side thereof is of a generally S-shaped cross section and includes an intermediate panel 12 which at a forward end thereof is reversely curved as at 14 and terminating in an upper panel 16. The intermediate panel 12, at the rear end thereof is provided with a curve 18, then a generally straight vertical portion 20 followed by another curve 22 and finally a bottom panel 24. The article carrier 10 is of a generally springy or resilient construction as will be described in detail hereinafter. The panels 12, 16 define an upper slot 26 in which there is received an outer forward edge of a conventional sun visor 28. The panels 12 and 24 also define a lower slot 30 which is of a greater depth than the slot 26 and which is of a depth to conveniently receive eyeglasses 32 or other articles of like general heights.

It will be readily apparent from FIG. 2 that the article holder 10, when positioned on the sun visor 28, will have the lower slot 30 opening towards the occupant of the vehicle for convenient removal of the article stored therein.

The panel 16 may be provided with an elastic cloth holder 34 for holding a pencil or pen 36. Further, there may be bonded to the upper surface of the panel 16 a thin mirror 38. When the sun visor 28 is tilted downwardly, the mirror 38 immediately becomes available for use.

Reference is now made to FIG. 3 wherein there is illustrated the constructional detail of the article holder 10. It will be seen that there is a rigid core 40. The rigid core 40 may be comprised of any material capable of forming the S-shaped configuration of the article holder device. A presently preferred material is a sheet metal core as disclosed in the drawing, although other materials such as plastic or the like will perform satisfactorily. The sheet metal core 40 is bent or formed to the generally S-shaped configuration of the article holder 10. The core 40 is covered on opposite sides thereof with different fabrics. These fabrics include a fabric 42 which is carried by the top of the panel 16 and is preferably formed of the same type of fabric as the headliner of an automobile. It will be understood that any other soft material may be utilized. The material is preferably a soft fuzzy fabric which will provide a cushion for receipt of the eyeglasses or other article. It is desired that the fabric 42 be bonded to the sheet metal core 40. However, when a suitable adhesive is utilized, that adhesive will bleed through. Accordingly, it is preferred that there be bonded to the underside of the fabric 42 a foam plastic layer 44 which, in turn, will be bonded to a paperboard layer 46. The paperboard layer 46 will be suitably adhesively bonded to the core 40.

The underside of the panel 16 and like related portions of the core 40 will be covered with a second fabric 48 which preferably is a different material than fabric 42 such as vinyl, leather, nylon or the like. A preferred material is a relatively smooth vinly fabric. The fabric 48 will be bonded to an inner foam plastic layer 50 which, in turn, will be bonded to another paperboard layer 52. The paperboard layer 52, like the paperboard layer 46, will be adhesively bonded to the core 40.

It is to be noted that the fabrics 42, 48 and their backings will extend beyond the edges of the core 40. This permits a suitable tape 54 to be utilized in binding the edges of the fabrics 42, 48 with the tape 54 being attached to the fabrics 42, 48 by stitches 56.

Certain eyeglasses are constructed in such a manner that the folding arms of the eyeglasses may scratch the eyeglass lens when the glasses are closed and inserted into slot 30. In order to avoid this problem, a T-shaped divider member 66 shown in FIGS. 2, 5, and 6 may be inserted in slot 30 to separate the lens portion of the eyeglasses from the folding arms of the eyeglasses as shown in FIG. 2. It is understood the member 66 may be permanently connected in slot 30 or adopted to be removeably inserted in slot 30. Member 66 is preferable made of a rigid material such as cardboard 68 covered with a suitable fabric material 70.

The elastic fabric which forms the holder 34 may be attached to the free edge of the panel 16 by having one end folded over the edge of the panel as at 58 and being sewn to the fabrics 42, 48 and their backings. The opposite end of the elastic fabric, which may be identified by the numeral 60, is sewed as at 62 to form a loop 64, which loop 64 constitutes the holder 34. It is understood that other types of holders may be used with the article holder 10 such as a metal slip carrying the elastic fabric loop (not shown).

The mirror 38 is mounted on the article holder 10 by bonding it to the fabric 42.

It is to be understood that the fabrics 42 and 48 together with their bonded backings will be supplied in sheet form and then cut to size and applied to the sheet metal core 40 while the core 40 is in a planar state as is generally shown in FIG. 4. This readily facilitates the stitching of the tape 54 around the edges of the fabrics and the application of the pen or pencil holder 34. Then the sheet metal core 40 is bent to the shape shown in FIG. 3. The article holder is now complete except for the application of the mirror 38.

Any desired identifying indicia may be printed on the selected one of the fabrics 42, 48 while the fabric is in its flat state either before or after it is applied to the core 40.

Although only a preferred embodiment of the article holder has been specifically illustrated and described herein, it is to be understood that minor variations may be made in the article holder without departing from the spirit and scope of the invention as defined by the appended claims.

It is claimed:

1. An article holder for attachment to a vehicle sun visor, said article holder being of a solid sheet core section configured into a generally S-shaped cross section throughout its entire width and length and including an upper rearwardly opening slot for receiving a sun visor and a lower rearwardly opening slot for receiving an article to be supported, said upper slot being of a height and depth to snugly receive a sun visor, and said lower slot being of a greater height than said upper slot and having a depth sufficient for receiving articles such as eyeglasses wherein said lower slot includes a T-shaped divider member adapted to be held in said lower slot to separate the lens portion of said eyeglasses from the folding arms of said eyeglasses.

* * * * *